(12) United States Patent
Kawasoe et al.

(10) Patent No.: US 8,460,821 B2
(45) Date of Patent: Jun. 11, 2013

(54) NON-AQUEOUS ELECTROLYTE SECONDARY BATTERY, NON-AQUEOUS ELECTROLYTE, AND METHOD FOR FABRICATING NON-AQUEOUS ELECTROLYTE SECONDARY BATTERY

(75) Inventors: Yudai Kawasoe, Kyoto (JP); Katsushi Nishie, Kyoto (JP); Tomonori Kako, Kyoto (JP); Shinya Kitano, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 81 days.

(21) Appl. No.: 13/169,027

(22) Filed: Jun. 27, 2011

(65) Prior Publication Data
US 2011/0318655 A1 Dec. 29, 2011

(30) Foreign Application Priority Data
Jun. 28, 2010 (JP) ................................ 2010-145887

(51) Int. Cl.
*H01M 10/40* (2006.01)
*H01M 10/056* (2010.01)

(52) U.S. Cl.
USPC ........................... 429/199; 429/331; 429/340

(58) Field of Classification Search
None
See application file for complete search history.

(56) References Cited

U.S. PATENT DOCUMENTS

| | | | | |
|---|---|---|---|---|
| 6,444,360 B2 * | 9/2002 | Gan et al. | | 429/215 |
| 8,163,427 B2 * | 4/2012 | Abe et al. | | 429/330 |
| 2002/0197537 A1 * | 12/2002 | Kim et al. | | 429/340 |
| 2004/0013946 A1 * | 1/2004 | Abe et al. | | 429/326 |
| 2010/0190065 A1 * | 7/2010 | Ihara et al. | | 429/331 |

FOREIGN PATENT DOCUMENTS

| | | |
|---|---|---|
| JP | 11-162511 | 6/1999 |
| JP | 2004-111349 | 4/2004 |
| JP | 2005-317389 | 11/2005 |
| JP | 2007-141831 | 6/2007 |
| JP | 2010-251313 | 11/2010 |

* cited by examiner

*Primary Examiner* — John S Maples
(74) *Attorney, Agent, or Firm* — Jianq Chyun IP Office

(57) ABSTRACT

A non-aqueous electrolyte secondary battery is described, capable of inhibiting the raise of the internal resistance at a low temperature after use in a high-temperature circumstance, and having a good power performance at a low temperature. The non-aqueous electrolyte secondary battery has a non-aqueous electrolyte, and is characterized in containing a sulfate ester with a specific structure in an amount of 4.0 wt % or less relative to the total weight of the non-aqueous electrolyte.

8 Claims, 1 Drawing Sheet

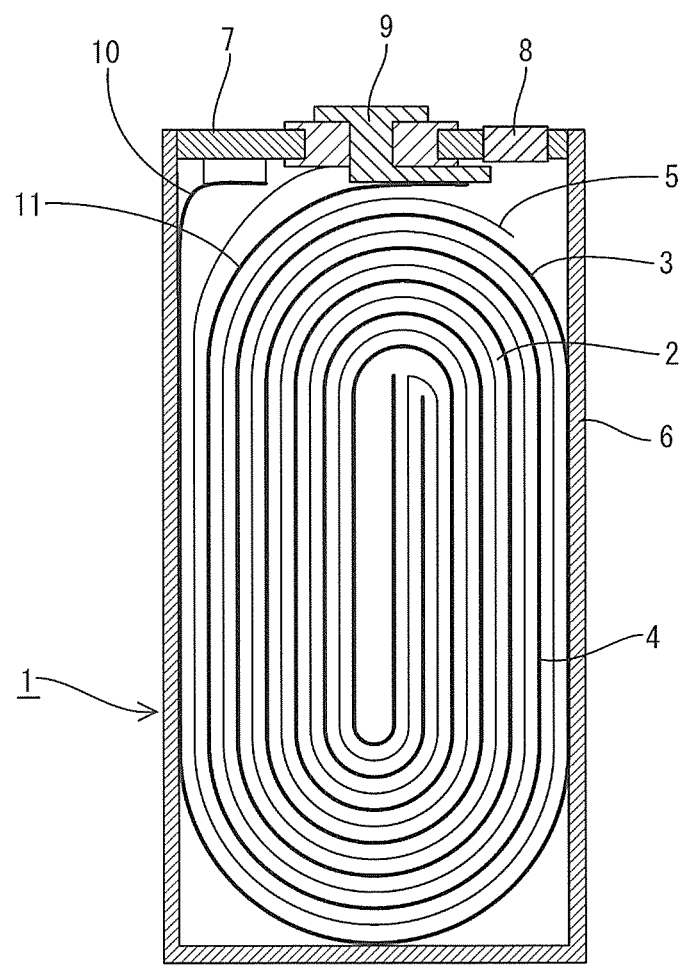

NON-AQUEOUS ELECTROLYTE SECONDARY BATTERY, NON-AQUEOUS ELECTROLYTE, AND METHOD FOR FABRICATING NON-AQUEOUS ELECTROLYTE SECONDARY BATTERY

CROSS-REFERENCE TO RELATED APPLICATION

This application claims the priority benefit of Japan application serial no. 2010-145887, filed Jun. 28, 2010. The entirety of the above-mentioned patent application is hereby incorporated by reference herein and made a part of this specification.

BACKGROUND OF THE INVENTION

1. Field of the Invention

This invention relates to a non-aqueous electrolyte secondary battery, a non-aqueous electrolyte, and a method for fabricating a non-aqueous electrolyte secondary battery.

2. Description of Related Art

Compared with other secondary batteries such as lead-acid batteries or alkaline batteries, non-aqueous electrolyte secondary batteries such as lithium ion secondary batteries have a high energy density and therefore are widely used as power supplies of portable devices such as mobile phones. In recent years, much study and development have been carried out for use of a non-aqueous electrolyte secondary battery as a power supply for a movable object such as an electric vehicle.

Though the non-aqueous electrolyte secondary battery like lithium ion secondary battery has high energy density, its battery performance is lowered, for example, the discharge capacity is lowered or the internal resistance is increased, due to repeated charge/discharge or long-term storage. The lowering of battery performance is mainly caused by the reaction between the electrode plate and the non-aqueous electrolyte. To inhibit the lowering of battery performance, it has been studied to add various additives to the non-aqueous electrolyte. For example, Japanese Patent Publication No. 1999-162511 discloses using a sulfate ester as an additive of a non-aqueous electrolyte.

As a power supply for a movable object such as an electric vehicle or a hybrid-electric vehicle, the battery is used under severe temperature conditions. For example, when the movable object is used in a cold region or in winter, the temperature of the battery may be below zero. On the other hand, when being used in summer, the battery may have a temperature up to 60° C. due to its carrying position. Therefore, the battery carried on a movable object needs to exert its performance in a wide temperature range. However, it is found that a battery charged/discharged repeatedly in a high-temperature circumstance or stored for long time in a high-temperature circumstance is increased in the internal resistance and lowered in the power performance. Particularly, compared with the internal resistance at a normal temperature, the internal resistance at a low temperature is increased significantly. Therefore, when the battery is used in a low-temperature circumstance after being used in a high-temperature circumstance, there is a problem that a sufficient power performance cannot be ensured.

SUMMARY OF THE INVENTION

To solve the above problems, in-depth studies about various additives in non-aqueous electrolytes have been done. The results show that addition of a sulfate ester with a specific structure in a non-aqueous electrolyte can greatly inhibit increase of the internal resistance at a low temperature after use in a high-temperature circumstance.

The first item of this invention is a non-aqueous electrolyte secondary battery with a non-aqueous electrolyte, being characterized in that the non-aqueous electrolyte contains a sulfate ester of Formula (1) in an amount of 4.0 wt % or less relative to the total weight of the non-aqueous electrolyte, wherein at least three or more of R1-R6 are alkyl groups in Formula (1). Herein, each alkyl group is a $C_{1-3}$ alkyl group.

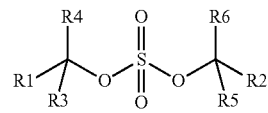

(1)

According to the first item, addition of a sulfate ester of Formula (1) in which at least three or more of R1-R6 are alkyl to a non-aqueous electrolyte in a non-aqueous electrolyte secondary battery can inhibit the increase of the internal resistance at a low temperature after use in a high-temperature circumstance, as compared to a non-aqueous electrolyte secondary battery added with a sulfate ester of Formula (1) in which two or less of R1-R6 are alkyl groups.

The battery of the second item of this invention is characterized in that the sulfate ester in the battery of the first item includes one or more compounds selected from isopropyl ethyl sulfate of Formula (2), diisopropyl sulfate of Formula (3), and di-t-butyl sulfate of Formula (4).

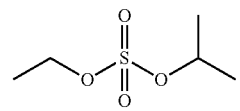

(2)

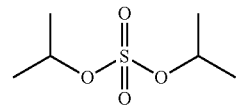

(3)

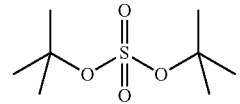

(4)

Accordingly to the second item, as compared to the use of other sulfate esters, the use of isopropyl ethyl sulfate, diisopropyl sulfate and di-t-butyl sulfate among sulfate esters of Formula (1) with at least three or more of R1-R6 being alkyl groups can further reduce the increase of the internal resistance, and is preferred therefore.

The third item of this invention is characterized in that the battery of the first or second item contains, in an amount of 3.0 wt % or less relative to the total weight of the non-aqueous electrolyte, a lithium phosphate compound containing fluorine and oxygen.

The battery of the fourth item of this invention is characterized in that the lithium phosphate compound in the battery of the third item includes one or more compounds selected from lithium monofluorophosphate ($Li_2PO_3F$), lithium difluorophosphate ($LiPO_2F_2$), and the compound of Formula (5).

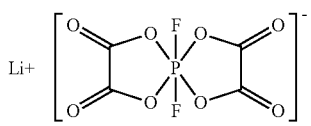

(5)

According to the third and fourth items, further addition of the lithium phosphate compound containing fluorine and oxygen to the non-aqueous electrolyte can greatly reduce the increase of internal resistance at a low temperature after the use in a high-temperature circumstance, as compared to a battery added with a sulfate ester or a lithium phosphate compound alone.

The fifth item of this invention is characterized in that a non-aqueous electrolyte of a non-aqueous electrolyte secondary battery contains a sulfate ester of Formula (1) in an amount of 4.0 wt % or less, in which at least three or more of R1-R6 are alkyl groups.

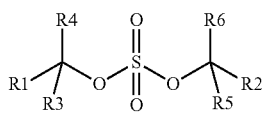

(1)

The sixth item of this invention is a method for fabricating a non-aqueous electrolyte secondary battery, being characterized in using the non-aqueous electrolyte of the fifth item of this invention.

BRIEF DESCRIPTION OF THE DRAWINGS

FIG. 1 is a cross-sectional view of a non-aqueous electrolyte secondary battery according to Embodiment 1 of this invention.

DESCRIPTION OF THE EMBODIMENTS

Embodiments of this invention are described below in details, but the description is only an example of this invention, and this invention is not limited to the contents of the description.

FIG. 1 illustrates Embodiment 1 of this invention. The non-aqueous electrolyte secondary battery (referred to as "secondary battery" hereinafter) shown in FIG. 1 has a power generating element that is formed by winding a positive electrode plate and a negative electrode plate separated by a separator and is accommodated in a battery box. The positive electrode plate is formed by coating a positive electrode mixture containing a positive-electrode active material on both sides of a positive electrode current collector made of an aluminum foil or an aluminum alloy foil. The negative electrode plate is formed by coating a negative electrode mixture containing a negative-electrode active material on both sides of a negative electrode current collector made of a copper foil.

The positive electrode plate is connected to a battery cover through a positive electrode lead line, the negative electrode plate is connected to a negative electrode terminal disposed on the battery cover, and the battery cover is installed through laser welding such that an opening thereof is blocked. The battery box has thereon a hole through which the non-aqueous electrolyte is injected into the battery box. The hole is sealed after the injection of the non-aqueous electrolyte, thus forming a non-aqueous electrolyte secondary battery.

The non-aqueous electrolyte of this invention may be formed by dissolving an electrolyte salt in a non-aqueous solvent. Examples of the electrolyte salt include $LiClO_4$, $LiPF_6$, $LiBF_4$, $LiAsF_6$, $LiCF_3CO_2$, $LiCF_3(CF_3)_3$, $LiCF_3(C_2F_5)_3$, $LiCF_3SO_3$, $LiCF_3CF_2SO_3$, $LiCF_3CF_2CF_2SO_3$, $LiN(SO_2CF_3)_2$, $LiN(SO_2CF_2CF_3)_2$, $LiN(COCF_3)_2$, $LiN(COCF_2CF_3)_2$ and $LiPF_3(CF_2CF_3)_3$, which may be used alone or in a mixture of two or more thereof. In view of conductivity, the electrolyte salt is preferably $LiPF_6$, and $LiPF_6$ may be used as a main component of the electrolyte salt which is mixed with other electrolyte salt(s) such as $LiBF_4$.

Examples of useful non-aqueous solvents of the non-aqueous electrolyte include ethylene carbonate, propylene carbonate, butylene carbonate, trifluoropropylene carbonate, γ-butyrolactone, sulfolane, 1,2-dimethoxyethane, tetrahydrofuran, methyl acetate, ethyl acetate, methyl propionate, ethyl propionate, dimethyl sulfoxide, dimethyl carbonate, diethyl carbonate, methyl ethyl carbonate, dipropyl carbonate, methyl propyl carbonate and dibutyl carbonate, etc. In view of adjusting the conductivity or viscosity of the non-aqueous electrolyte, it is preferred to use them in admixture.

The non-aqueous electrolyte of this invention contains a sulfate ester of Formula (1) in an amount of 4.0 wt % or less relative to the total weight thereof, wherein at least three or more of R1-R6 are alkyl groups. Herein, each alkyl group is $C_{1-3}$ alkyl.

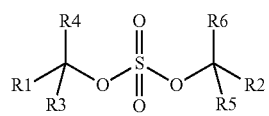

(1)

Specific examples of the compounds of Formula (1) include t-butyl methyl sulfate, ethyl isopropyl sulfate, t-butyl ethyl sulfate, s-butyl ethyl sulfate, propyl isopropyl sulfate, t-butyl propyl sulfate, s-butyl propyl sulfate, butyl isopropyl sulfate, butyl t-butyl sulfate, butyl s-butyl sulfate, diisopropyl sulfate, t-butyl isopropyl sulfate, s-butyl isopropyl sulfate, di-t-butyl sulfate, t-butyl s-butyl sulfate and di-s-butyl sulfate, wherein isopropyl ethyl sulfate of Formula (2), diisopropyl sulfate of Formula (3) and di-t-butyl sulfate of Formula (4) are preferred. Further, diisopropyl sulfate of Formula (3) can be easily prepared and is more preferred therefore. Moreover, the compounds may also be mixed and then added to the non-aqueous electrolyte.

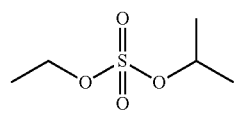

(2)

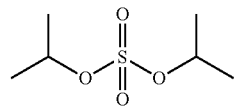

(3)

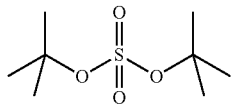

(4)

For the non-aqueous electrolyte secondary battery of this invention, by adding a sulfate ester of Formula (1) in which at least three or more of R1-R6 are alkyl groups to the non-aqueous electrolyte, the increase of internal resistance at a low temperature after use in a high-temperature circumstance can be inhibited, and the power performance at a low temperature can be improved. The detailed mechanism of inhibiting the increase of the internal resistance by adding the sulfate ester is unclear, but it may be assumed that when the number of alkyl groups in R1-R6 in Formula (1) is three or more, as compared to a case where the number of alkyl groups is two or less, the sulfate ester easily react with the negative electrode material at the initial stage of the use of the battery (use after the fabrication of the battery) so that a thick and stable protection film is formed on the particle surface of the negative electrode material. The protection film is still stable even in a high-temperature circumstance to inhibit the reaction between the solvent of the non-aqueous electrolyte and the negative electrode material in the high-temperature circumstance that forms an insulation coating, so that the increase of internal resistance is inhibited. Furthermore, the at least three or more alkyl groups in R1-R6 in Formula (1) are $C_{1-3}$ alkyl groups. If the carbon number is 4 or more, the molecule becomes large and is difficult to dissolve in the non-aqueous electrolyte. Preferably, the rest of R1-R6 other than alkyl is hydrogen.

The content of the sulfate ester of Formula (1) in which at least three or more of R1-R6 are alkyl groups is 4.0 wt % or less relative to the total weight of the non-aqueous electrolyte. If the content of the sulfate ester is greater than 4.0 wt %, the reaction between the sulfate ester and the negative electrode material is excessive, so that the protection film is excessively thick, the internal resistance at the initial stage of the use of the battery is increased, and more gas is generated due to the reaction with the negative electrode material in a high-temperature circumstance. On the other hand, if the content of the sulfate ester is too low, the reaction with the negative electrode material is deficient so that a stable protection film cannot be formed. Therefore, the content of the sulfate ester is preferably 0.01 wt % or more relative to the total weight of the non-aqueous electrolyte. As a protection film with a suitable thickness is formed on the particle surfaces of the negative electrode material due to the reaction between the sulfate ester and the negative electrode material, in view of inhibiting the increase of internal resistance at a low temperature after the use in a high-temperature circumstance without increasing the internal resistance at the initial stage, the content of the sulfate ester is preferably between 0.01 wt % and 4.0 wt %, and more preferably between 0.05 wt % and 1.0 wt %, relative to the total weight of the non-aqueous electrolyte.

In the non-aqueous electrolyte secondary battery of this invention, besides the sulfate ester, a lithium phosphate compound containing fluorine and oxygen may also be added. Particularly preferably, lithium monofluorophosphate, lithium difluoro-phosphate and/or the compound of Formula (5) are added as the lithium phosphate compound. Co-existence of the sulfate ester and the lithium phosphate compound in the non-aqueous electrolyte can lower the increase ratio of the internal resistance at a low temperature after use in a high-temperature circumstance, as compared to a case where the sulfate ester or the lithium phosphate compound is added alone.

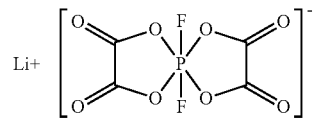

(5)

The content of the lithium phosphate compound is preferably between 0.01 wt % and 3.0 wt % relative to the total weight of the non-aqueous electrolyte. Especially when the content of the lithium phosphate compound is between 0.5 wt % and 2.0 wt %, the increase of internal resistance is remarkably inhibited. The lithium phosphate compounds of this invention not only include the compounds in a state that the lithium ion and the anion are bonded, but also include the compounds in a state that the lithium ion and the anion are dissociated from each other.

Besides the above compounds, in order to improve the cycle life characteristic and the safety of the battery, the following compounds may be added to the non-aqueous electrolyte alone or in a mixture of two or more. The compounds include: carbonates such as vinylene carbonate, methyl vinylene carbonate, monofluoroethylene carbonate and difluoroethylene carbonate, vinyl esters such as vinyl acetate and vinyl propionate, aromatic compounds such as benzene and toluene, alkanes substituted with halogen such as perfluorooctane, and silyl esters such as tris(trimethylsilyl) borate, tris(trimethylsilyl) phosphate, tetrakis(trimethylsilyl) titanate.

The positive-electrode active material of the positive electrode plate in the non-aqueous electrolyte secondary battery of this invention is not particularly limited, and various positive-electrode active materials may be used, for example, a composite oxide of lithium and a transition metal with a general formula of $Li_xM1_pO_{2-\delta}$ or $Li_xM2_qO_{4-\delta}$ (each of M1 and M2 is at least one metal selected from cobalt, nickel and manganese, $0.4 \leq x \leq 1.2$, $0.8 \leq p \leq 1.2$, $1.5 \leq q \leq 2.2$, and $0 \leq \delta \leq 0.5$), or a composite oxide containing at least one element selected from Al, Fe, Cr, Ti, Zn, phosphorus and boron.

Further, a compound having a general formula of $Li_xM3_uPO_4$ (M3 is a transition metal of Group 3d, $0 \leq x \leq 2$, and $0.8 \leq u \leq 1.2$) and having an olivine structure may be used as the positive-electrode active material. Moreover, in order to ensure the conductivity, the compound may be used after being coated with amorphous carbon.

Besides the above positive-electrode active material, a conductive agent and a binder may also be contained in the positive electrode plate 3. Examples of useful conductive agents include acetylene black, carbon black and graphite. Examples of the binder include polyvinylidene fluoride, vinylidene fluoride-hexafluoropropylene co-polymer, styrene-butadiene rubber and polyacrylonitrile, which may be used alone or in admixture.

Examples of useful negative-electrode active materials of the negative electrode plate in the non-aqueous electrolyte secondary battery of this invention include a carbon material, a compound of an alloy of aluminum, silicon, lead, tin, zinc or cadmium with lithium, metal lithium, and a metal oxide with a general formula of M4Oz (M4 is at least one element selected from tungsten, molybdenum, silicon, copper and tin, and $0 \leq z \leq 2$), wherein the carbon material is preferred. Examples of useful carbon materials include graphite, nongraphitizable carbon, graphitizable carbon, and a mixture thereof. Like the positive electrode plate, the negative electrode plate may also have a binder such as polyvinylidene fluoride or styrene-butadiene rubber added.

The separator 5 may be a non-woven fabric or a synthetic resin micro-porous film, as long as it can electrically isolate the positive electrode plate from the negative electrode plate. Particularly, in view of the processability and durability, the synthetic resin micro-porous film is preferred. Examples of useful synthetic resin micro-porous films include a polyolefin micro-porous film formed by polyethylene and polypropylene, or a heat-resistant resin layer with an aramid layer on the surface of such a polyolefin micro-porous film.

EXAMPLES

The secondary battery illustrated in FIG. 1 is fabricated by the following process.

1. Fabrication of the Secondary Battery of Example 1

(1) Fabrication of the Positive Electrode Plate

To a mixture of $LiNi_{1/6}Mn_{1/6}CO_{2/3}O_2$ as a positive-electrode active material, acetylene black as a conductivity assistant, and polyvinylidene fluoride as a binder in amounts of 90 wt %, 5 wt %, and 5 wt % respectively, a suitable amount of N-methyl-pyrrolidone (NMP) was added to fabricate a positive electrode mixture paste with an adjusted viscosity. The positive electrode mixture paste was coated on both sides of an aluminum foil of 20 μm thick and dried to fabricate a positive electrode plate. The positive electrode plate had an exposed portion of the aluminum foil that was not coated with the positive electrode mixture and was bonded to a positive electrode lead line.

(2) Fabrication of the Negative Electrode Plate

To a mixture of nongraphitizable carbon as a negative-electrode active material and polyvinylidene fluoride as a binder in amounts of 90 wt % and 10 wt % respectively, a suitable amount of NMP was added to fabricate a negative electrode mixture paste with an adjusted viscosity. The negative electrode mixture paste was coated on both sides of a copper foil of 15 μm thick and dried to fabricate a negative electrode plate, which had an exposed portion of the copper foil that was not coated with the negative electrode mixture and was bonded to a negative electrode plate lead line.

(3) Fabrication of the Secondary Battery without Electrolyte Injected

The separator formed by a micro-porous film made of polyethylene was inserted between the positive electrode plate and the negative electrode plate, and the positive electrode plate and the negative electrode plate were winded to form a power generation element. The power generation element was accommodated in a battery box through an opening of the battery box, the positive electrode plate lead line was bonded to a battery cover, the negative electrode plate lead line was bonded to a negative electrode terminal, and then the battery cover was fastened in the opening of the battery box and bonded to the battery box through laser welding. Thus, a secondary battery without a non-aqueous electrolyte was fabricated.

(4) Formulation and Injection of the Non-Aqueous Electrolyte $LiPF_6$ was dissolved in a mixed solvent of ethylene carbonate (EC), dimethyl carbonate (DMC) and ethyl methyl carbonate (EMC) in a volume ratio of 3:2:5 in a concentration of 1 mol/L, and isopropyl ethyl sulfate was added, in an amount of 0.01 wt % relative to the total weight of the non-aqueous electrolyte. The non-aqueous electrolyte was injected into the battery box through an injection port disposed at a side of the battery box, and the injection port was sealed with a plug. Thus, a secondary battery of Example 1 was fabricated.

2. Fabrication of Secondary Batteries of Examples 2-16 and Comparative Examples 1-9

The batteries of Examples 2-5 and Comparative Examples 1-2 were fabricated by the same method for fabricating the battery of Example 1, except that isopropyl ethyl sulfate was added in an amount of 0.5 wt %, 1.0 wt %, 2.0 wt %, 4.0 wt %, 0.0 wt % and 6.0 wt %, respectively, relative to the total weight of the non-aqueous electrolyte.

The batteries of Examples 6-10 and Comparative Example 3 were fabricated by the same method for fabricating the battery of Example 1, except that diisopropyl sulfate was added instead of isopropyl ethyl sulfate in Example 1 in an amount of 0.01 wt %, 0.5 wt %, 1.0 wt %, 2.0 wt %, 4.0 wt % and 6.0 wt %, respectively, relative to the total weight of the non-aqueous electrolyte.

The batteries of Examples 11-13 were made by the same method for making the battery of Example 1, except that isopropyl t-butyl sulfate was added instead of isopropyl ethyl sulfate in Example 1 in an amount of 0.5 wt %, 1.0 wt % and 2.0 wt %, respectively, relative to the total weight of the non-aqueous electrolyte.

The batteries of Examples 14-16 were made by the same method for making the battery of Example 1, except that di-t-butyl sulfate was added instead of isopropyl ethyl sulfate in Example 1 in an amount of 0.5 wt %, 1.0 wt % and 2.0 wt %, respectively, relative to the total weight of the non-aqueous electrolyte.

The batteries of Comparative Examples 4-7 were fabricated by the same method for fabricating the battery of Example 1, except that dimethyl sulfate and diethyl sulfate were added instead of isopropyl ethyl sulfate in Example 1 in amounts of 0.5 wt % and 1.0 wt %, respectively, relative to the total weight of the non-aqueous electrolyte.

The batteries of Comparative Examples 8 and 9 were fabricated by the same method for fabricating the battery of Example 1, except that di-n-propyl sulfate and di-n-butyl sulfate were added instead of isopropyl ethyl sulfate in Example 1 in amounts of 0.5 wt % respectively relative to the total weight of the non-aqueous electrolyte.

3. Fabrication of the Secondary Battery of Example 17

$LiPF_6$ was dissolved in a mixed solvent of ethylene carbonate (EC), dimethyl carbonate (DMC) and ethyl methyl carbonate (EMC) in a volume ratio of 3:2:5 in a concentration of 1 mol/L, and diisopropyl sulfate and the compound of Formula (5) (referred to as LFP) were added, in amounts of 0.01 wt % and 0.01 wt %, respectively, relative to the total weight of the non-aqueous electrolyte, to formulate a non-aqueous electrolyte. Then, the battery of Example 17 was fabricated using the non-aqueous electrolyte by the same method as described in Example 1.

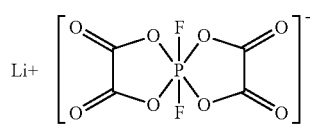

(5)

4. Fabrication of the Batteries of Examples 18-53 and Comparative Examples 10-11

The batteries of Examples 18-28 and Comparative Examples 10-11 were made by the same method in Example 17, except that diisopropyl sulfate and LFP in Example 17 were added in the amounts shown in Table 2 relative to the total weight of the non-aqueous electrolyte.

The batteries of Examples 29-40 were made by the same method in Example 17, except that isopropyl ethyl sulfate instead of diisopropyl sulfate in Example 17, and LFP were added in the amounts shown in Table 3 relative to the total weight of the non-aqueous electrolyte.

The batteries of Examples 41-45 were made by the same method in Example 17, except that diisopropyl sulfate, and lithium monofluorophosphate instead of LEP in Example 17 were added in the amounts shown in Table 4 relative to the total weight of the non-aqueous electrolyte.

The batteries of Examples 46-50 were made by the same method in Example 17, except that diisopropyl sulfate, and lithium difluorophosphate instead of LEP in Example 17 were added in the amounts shown in Table 4 relative to the total weight of the non-aqueous electrolyte.

The batteries of Examples 51-53 were made by the same method in Example 17, except that isopropyl ethyl sulfate, isopropyl t-butyl sulfate or di-t-butyl sulfate instead of diisopropyl sulfate in Example 17, and lithium monofluorophosphate instead of LEP were added in amounts of 0.5 wt % respectively relative to the total weight of the non-aqueous electrolyte.

5. Evaluation Test (1) Initial Capacity Check Test

The initial discharge capacity check test was done with the batteries of Examples 1-53 and Comparative Examples 1-11 under the following charge/discharge conditions. Each battery was charged to 4.2 V at a constant current of 450 mA at 25° C. and then charged at a constant voltage of 4.2 V. The duration of the constant-current charging and the constant-voltage charging was 3 hours in total. After being charged, each battery was discharged at a constant current of 450 mA to a discharge termination voltage of 2.5 V, and the discharge capacity was taken as an initial capacity.

(2) Cycle Life Test at 60° C.

The cycle life test at 60° C. was carried out with the batteries after the initial discharge capacity test under the following conditions.

Each battery was charged to 4.0 V at a constant current of 900 mA at 60° C. and then charged at a constant voltage of 4.0 V, wherein the duration of the constant-current charging and the constant-voltage charge was 30 minutes in total. Then, each battery was discharged at a constant current of 900 mA at 60° C. to 3.0 V. The above process was taken as one cycle and was repeated 2000 cycles. After charging or discharging, the process was stopped for 10 minutes at 60° C. After the 2000 cycles, each battery was charged and discharged at the same conditions in the initial capacity check test. Herein, the charge voltage 4.0 V and the discharge termination voltage 3.0 V were respectively the voltages at which the capacities of the batteries were 80% (State of Charge (SOC)=80%) and 20% (SOC=20%) of the capacity accumulated from the discharge termination voltage 2.5 V to the charge voltage 4.2 V in the initial capacity check test.

(3) Calculation of the Internal Resistance at a Low Temperature

Before and after the cycle life test at 60° C., each battery was charged to 3.7 V at a constant current of 450 mA at 25° C. and then charged at a constant voltage of 3.7 V (the charge time was 3 hours in total), thus being set at SOC=50%. After each battery was kept at SOC=50% at −20° C. for 5 hours, the voltage (E1) after 10-second discharge at 90 mA (I1) and the voltage (E2) after 10-second discharge at 225 mA (I2) were determined respectively. The resistance (Rx) at −20° C. was calculated from the discharge currents I1 and I2 and the determined voltages E1 and E2 using the following formula. The increase ratio of the resistance at −20° C. after the cycle life test at 60° C. relative to the resistance at −20° C. before the cycle life test at 60° C. was also calculated.

$$Rx = |(E1-E2)/(I1-I2)|$$

6. Observations

The resistances and the resistance increase ratios at −20° C. of the batteries of Examples 1-16 and Comparative Examples 1-9 before and after the cycle life test at 60° C. are listed in Table 1. For the batteries (of Examples 1-16) added with isopropyl ethyl sulfate, diisopropyl sulfate, isopropyl t-butyl sulfate and di-t-butyl sulfate of Formula (1) in which three or more of R1-R6 are alkyl groups in the amounts of 0.01-4.0 wt % relative to the total weight of the non-aqueous electrolyte, a desired result that the increase ratio of the resistance after the cycle life test at 60° C. was lower than 60% was obtained. For the batteries (of Comparative Examples 2-3) added with isopropyl ethyl sulfate and diisopropyl sulfate in the amounts of 6.0 wt %, the resistance after the cycle life test at 60° C. was increased and the increase ratio after the cycle life test at 60° C. was higher than 90%. This indicates that if more sulfate ester is added relative to the non-aqueous electrolyte, the initial resistance is increased and the resistance increase at a low temperature after the high-temperature cycle cannot be inhibited. The reason is assumed to be that an excessively thick protection film is formed on the surface of the carbon material due to the excessive reaction with the negative-electrode active material.

TABLE 1

| | Type of sulfate ester | Amount of sulphate ester added (wt %) | Resistance at −20° C. before test (mΩ) | Resistance at −20° C. after test (mΩ) | Increase ratio of resistance at −20° C. (%) |
|---|---|---|---|---|---|
| Comparative example 1 | Not added | — | 394 | 729 | 85 |
| Example 1 | Isopropyl ethyl sulfate | 0.01 | 381 | 533 | 40 |
| Example 2 | Isopropyl ethyl sulfate | 0.5 | 347 | 455 | 31 |
| Example 3 | Isopropyl ethyl sulfate | 1.0 | 351 | 451 | 28 |
| Example 4 | Isopropyl ethyl sulfate | 2.0 | 360 | 481 | 34 |
| Example 5 | Isopropyl ethyl sulfate | 4.0 | 420 | 574 | 37 |
| Comparative example 2 | Isopropyl ethyl sulfate | 6.0 | 492 | 948 | 93 |
| Example 6 | Diisopropyl sulfate | 0.01 | 378 | 523 | 38 |
| Example 7 | Diisopropyl sulfate | 0.5 | 346 | 451 | 30 |
| Example 8 | Diisopropyl sulfate | 1.0 | 341 | 438 | 28 |
| Example 9 | Diisopropyl sulfate | 2.0 | 351 | 462 | 32 |
| Example 10 | Diisopropyl sulfate | 4.0 | 402 | 560 | 39 |
| Comparative example 3 | Diisopropyl sulfate | 6.0 | 472 | 901 | 91 |
| Example 11 | Isopropyl t-butyl sulfate | 0.5 | 335 | 516 | 54 |
| Example 12 | Isopropyl t-butyl sulfate | 1.0 | 330 | 495 | 50 |

TABLE 1-continued

|  | Type of sulfate ester | Amount of sulphate ester added (wt %) | Resistance at −20° C. before test (mΩ) | Resistance at −20° C. after test (mΩ) | Increase ratio of resistance at −20° C. (%) |
|---|---|---|---|---|---|
| Example 13 | Isopropyl t-butyl sulfate | 2.0 | 339 | 533 | 54 |
| Example 14 | Di-t-butyl sulfate | 0.5 | 339 | 453 | 34 |
| Example 15 | Di-t-butyl sulfate | 1.0 | 334 | 462 | 38 |
| Example 16 | Di-t-butyl sulfate | 2.0 | 345 | 488 | 41 |
| Comparative example 4 | Dimethyl sulfate | 0.5 | 330 | 768 | 133 |
| Comparative example 5 | Dimethyl sulfate | 1.0 | 327 | 757 | 131 |
| Comparative example 6 | Diethyl sulfate | 0.5 | 381 | 869 | 128 |
| Comparative example 7 | Diethyl sulfate | 1.0 | 378 | 859 | 127 |
| Comparative example 8 | Di-n-propyl sulfate | 0.5 | 344 | 801 | 133 |
| Comparative example 9 | Di-n-butyl sulfate | 0.5 | 351 | 809 | 130 |

On the other hand, for the batteries (of Comparative Examples 4-9) having dimethyl sulfate, diethyl sulfate, di-n-propyl sulfate and di-n-butyl sulfate of Formula (1) with two or less of R1-R6 being alkyl added into the non-aqueous electrolyte, the resistance before the cycle life test at 60° C. was substantially the same as that of the batteries of Examples 1-16, but the resistance increase ratio after the cycle life test at 60° C. was higher than 100%. The reason is assumed to be that when the sulfate ester of Formula (1) with two or less of R1-R6 being alkyl is used, a stable protection film cannot be formed on the surface of the negative-electrode active material.

The resistance and the resistance increase ratio at −20° C. of the batteries of Examples 17-40 and Comparative Example 10-11 before and after the cycle life test at 60° C. are listed in Tables 2 and 3. Among the batteries (of Examples 17-28) having diisopropyl sulfate and LFP added to the non-aqueous electrolyte, for the batteries (of Examples 17-22 & 24-27) having LFP in an amount of 0.01-3.0 wt %, as compared to the batteries (of Examples 6-10) having the same amount of diisopropyl sulfate but no LFP added, the resistance increase ratio after the cycle life test at 60° C. was lowered, and the increase ratio was greatly lowered especially for the batteries having LFP in an amount of 0.5 wt % and 2.0 wt %. For the batteries (of Examples 23 & 28) having LFP in an amount of 4.0 wt %, it was found during the cycle life test at 60° C. that the battery thickness was increased, and the resistance increase ratio was higher than that of the batteries (of Examples 7 & 10) having no LFP added. For the batteries (of Examples 29-40) having isopropyl ethyl sulfate and LFP added, the result was the same as that of the batteries having diisopropyl sulfate and LFP added.

TABLE 2

|  | Sulfate ester | | Lithium phosphate compound | | Resistance at −20° C. before test (mΩ) | Resistance at −20° C. after test (mΩ) | Increase ratio of resistance at −20° C. (%) |
|---|---|---|---|---|---|---|---|
|  | Type | Added amount (wt %) | Type | Added amount (wt %) | | | |
| Comparative example 10 | Diisopropyl sulfate | 0.0 | LFP | 0.5 | 338 | 640 | 89 |
| Comparative example 11 | Diisopropyl sulfate | 0.0 | LFP | 2.0 | 350 | 630 | 80 |
| Example 17 | Diisopropyl sulfate | 0.01 | LFP | 0.01 | 360 | 497 | 38 |
| Example 18 | Diisopropyl sulfate | 0.01 | LFP | 2.0 | 348 | 504 | 45 |
| Example 19 | Diisopropyl sulfate | 0.5 | LFP | 0.01 | 348 | 402 | 16 |
| Example 20 | Diisopropyl sulfate | 0.5 | LFP | 0.5 | 344 | 309 | −10 |
| Example 21 | Diisopropyl sulfate | 0.5 | LFP | 2.0 | 349 | 302 | −13 |
| Example 22 | Diisopropyl sulfate | 0.5 | LFP | 3.0 | 352 | 440 | 25 |
| Example 23 | Diisopropyl sulfate | 0.5 | LFP | 4.0 | 357 | 582 | 63 |
| Example 24 | Diisopropyl sulfate | 4.0 | LFP | 0.01 | 406 | 555 | 37 |
| Example 25 | Diisopropyl sulfate | 4.0 | LFP | 0.5 | 401 | 459 | 14 |
| Example 26 | Diisopropyl sulfate | 4.0 | LFP | 2.0 | 380 | 460 | 21 |
| Example 27 | Diisopropyl sulfate | 4.0 | LFP | 3.0 | 384 | 503 | 31 |
| Example 28 | Diisopropyl sulfate | 4.0 | LFP | 4.0 | 390 | 653 | 67 |

TABLE 3

|  | Sulfate ester | | Lithium phosphate compound | | Resistance at −20° C. before test (mΩ) | Resistance at −20° C. after test (mΩ) | Increase ratio of resistance at −20° C. (%) |
|---|---|---|---|---|---|---|---|
|  | Type | Addition amount (wt %) | Type | Addition amount (wt %) | | | |
| Example 29 | Isopropyl ethyl sulfate | 0.01 | LFP | 0.01 | 363 | 503 | 39 |
| Example 30 | Isopropyl ethyl sulfate | 0.01 | LFP | 2.0 | 365 | 502 | 38 |
| Example 31 | Isopropyl ethyl sulfate | 0.5 | LFP | 0.01 | 342 | 430 | 26 |
| Example 32 | Isopropyl ethyl sulfate | 0.5 | LFP | 0.5 | 339 | 351 | 4 |
| Example 33 | Isopropyl ethyl sulfate | 0.5 | LFP | 2.0 | 352 | 376 | 7 |
| Example 34 | Isopropyl ethyl sulfate | 0.5 | LFP | 3.0 | 361 | 448 | 24 |
| Example 35 | Isopropyl ethyl sulfate | 0.5 | LFP | 4.0 | 367 | 598 | 63 |
| Example 36 | Isopropyl ethyl sulfate | 4.0 | LFP | 0.01 | 413 | 545 | 32 |

TABLE 3-continued

| | Sulfate ester | | Lithium phosphate compound | | Resistance at −20° C. before test (mΩ) | Resistance at −20° C. after test (mΩ) | Increase ratio of resistance at −20° C. (%) |
|---|---|---|---|---|---|---|---|
| | Type | Addition amount (wt %) | Type | Addition amount (wt %) | | | |
| Example 37 | Isopropyl ethyl sulfate | 4.0 | LFP | 0.5 | 410 | 494 | 20 |
| Example 38 | Isopropyl ethyl sulfate | 4.0 | LFP | 2.0 | 396 | 502 | 27 |
| Example 39 | Isopropyl ethyl sulfate | 4.0 | LFP | 3.0 | 399 | 531 | 33 |
| Example 40 | Isopropyl ethyl sulfate | 4.0 | LFP | 4.0 | 401 | 669 | 67 |

The resistance and the resistance increase ratio at −20° C. of the batteries of Examples 41-53 before and after the cycle life test at 60° C. are listed in Table 4. Among the batteries (of Examples 41-50) having diisopropyl sulfate and lithium mono-fluorophosphate or lithium difluorophosphate as a lithium phosphate compound added to the non-aqueous electrolyte, for the batteries having lithium monofluorophosphate or lithium difluorophosphate in an amount of 0.5-3.0 wt %, as compared with the battery (of Example 7) having no lithium monofluorophosphate or lithium difluorophosphate added, the resistance increase ratio after the cycle life test at 60° C. was greatly lowered.

TABLE 4

| | Sulfate ester | | Lithium phosphate compound | | Resistance at −20° C. before test (mΩ) | Resistance at −20° C. after test (mΩ) | Increase ratio of resistance at −20° C. (%) |
|---|---|---|---|---|---|---|---|
| | Type | Added amount (wt %) | Type | Added amount (wt %) | | | |
| Example 41 | Diisopropyl sulfate | 0.5 | Lithium mono-fluorophosphate | 0.5 | 337 | 390 | 16 |
| Example 42 | Diisopropyl sulfate | 0.5 | Lithium mono-fluorophosphate | 1.0 | 327 | 387 | 18 |
| Example 43 | Diisopropyl sulfate | 0.5 | Lithium mono-fluorophosphate | 2.0 | 317 | 382 | 21 |
| Example 44 | Diisopropyl sulfate | 0.5 | Lithium mono-fluorophosphate | 3.0 | 321 | 404 | 26 |
| Example 45 | Diisopropyl sulfate | 0.5 | Lithium mono-fluorophosphate | 4.0 | 325 | 583 | 79 |
| Example 46 | Diisopropyl sulfate | 0.5 | Lithium di-fluorophosphate | 0.5 | 347 | 421 | 21 |
| Example 47 | Diisopropyl sulfate | 0.5 | Lithium di-fluorophosphate | 1.0 | 352 | 417 | 18 |
| Example 49 | Diisopropyl sulfate | 0.5 | Lithium di-fluorophosphate | 2.0 | 359 | 410 | 14 |
| Example 49 | Diisopropyl sulfate | 0.5 | Lithium di-fluorophosphate | 3.0 | 352 | 433 | 23 |
| Example 50 | Diisopropyl sulfate | 0.5 | Lithium di-fluorophosphate | 4.0 | 345 | 611 | 77 |
| Example 51 | Isopropyl ethyl sulfate | 0.5 | Lithium mono-fluorophosphate | 0.5 | 341 | 394 | 16 |
| Example 52 | Isopropyl t-butyl sulfate | 0.5 | Lithium mono-fluorophosphate | 0.5 | 352 | 449 | 28 |
| Example 53 | Di-t-butyl sulfate | 0.5 | Lithium mono-fluorophosphate | 0.5 | 334 | 372 | 11 |

It can be known from the above results that when the content of the sulfate ester of Formula (1) with three or more of R1-R6 being alkyl groups is 4.0 wt % or less relative to the total weight of the non-aqueous electrolyte, the increase of the internal resistance at a low temperature after use in a high-temperature circumstance can be inhibited. Moreover, addition of a lithium phosphate compound containing fluorine and oxygen into the non-aqueous electrolyte can greatly lower the increase ratio of the internal resistance.

It will be apparent to those skilled in the art that various modifications and variations can be made to this invention without departing from the scope or spirit of this invention. Hence, it is intended that this invention covers its modifications and variations provided they fall within the scopes of the claims and their equivalents.

What is claimed is:

1. A non-aqueous electrolyte secondary battery, having a non-aqueous electrolyte that contains a sulfate ester of Formula (1) in an amount within a range of 0.01 wt % 4.0 wt % relative to a total weight of the non-aqueous electrolyte:

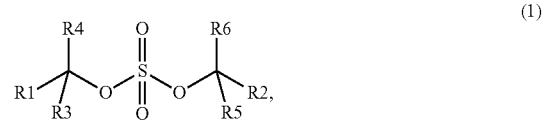

(1)

wherein at least three or more of R1-R6 are alkyl groups.

2. The non-aqueous electrolyte secondary battery of claim 1, wherein the sulfate ester comprises one or more compounds selected from isopropyl ethyl sulfate of Formula (2), diisopropyl sulfate of Formula (3), and di-t-butyl sulfate of Formula (4):

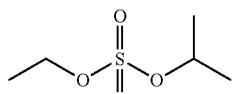
(2)

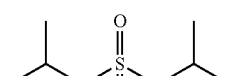
(3)

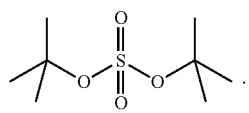
(4)

3. The non-aqueous electrolyte secondary battery of claim 1, wherein the non-aqueous electrolyte comprises, in an amount of 3.0 wt % or less relative to a total weight of the non-aqueous electrolyte, a lithium phosphate compound containing fluorine and oxygen.

4. The non-aqueous electrolyte secondary battery of claim 2, wherein the non-aqueous electrolyte comprises, in an amount of 3.0 wt % or less relative to a total weight of the non-aqueous electrolyte, a lithium phosphate compound containing fluorine and oxygen.

5. The non-aqueous electrolyte secondary battery of claim 3, wherein the lithium phosphate compound comprises one or more compounds selected from lithium monofluorophosphate, lithium difluorophosphate, and a compound of Formula (5):

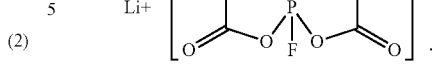
(5)

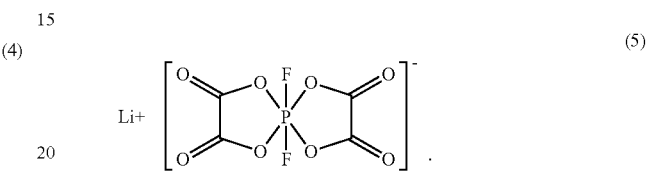

6. The non-aqueous electrolyte secondary battery of claim 4, wherein the lithium phosphate compound comprises one or more compounds selected from lithium monofluorophosphate, lithium difluorophosphate, and a compound of Formula (5):

(5)

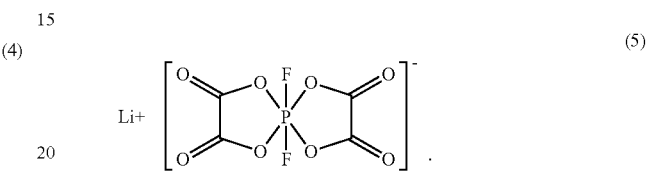

7. A non-aqueous electrolyte, comprising a sulfate ester of Formula (1) in an amount within a range of 0.01 wt % 4.0 wt %:

(1)

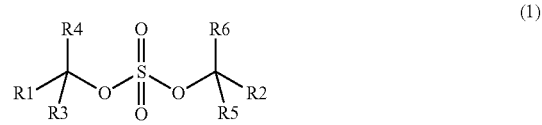

wherein at least three or more of R1-R6 are alkyl groups.

8. A method for fabricating a non-aqueous electrolyte secondary battery, which uses the non-aqueous electrolyte of claim 7.

* * * * *